United States Patent [19]
Altmann et al.

[11] Patent Number: 5,191,312
[45] Date of Patent: Mar. 2, 1993

[54] AUTOMOTIVE ACCESSORY CONTROL CENTER

[75] Inventors: Albrecht Altmann, Sibbesse; Norbert Eilers, Hildesheim, both of Fed. Rep. of Germany

[73] Assignee: Blaupunkt-Werke GmbH, Hildesheim, Fed. Rep. of Germany

[21] Appl. No.: 676,895

[22] Filed: Mar. 28, 1991

[30] Foreign Application Priority Data

Apr. 2, 1990 [DE] Fed. Rep. of Germany ....... 4010621

[51] Int. Cl.$^5$ .............................................. B60Q 1/00
[52] U.S. Cl. ................................... 340/441; 340/466; 340/525; 455/238.1
[58] Field of Search ............... 340/441, 525, 466, 988, 340/989, 991, 971, 973, 980, 905, 901, 902; 455/238, 238.1; 180/171, 170, 271, 282

[56] References Cited

U.S. PATENT DOCUMENTS

| 4,862,513 | 8/1989 | Brägas | 340/905 |
| 4,908,611 | 3/1990 | Iino | 340/705 |
| 5,059,956 | 10/1991 | Iino | 340/705 |

FOREIGN PATENT DOCUMENTS

| 1094025 | 12/1960 | Fed. Rep. of Germany . |
| 1105643 | 4/1961 | Fed. Rep. of Germany . |
| 1147416 | 4/1963 | Fed. Rep. of Germany . |
| 1151962 | 7/1963 | Fed. Rep. of Germany . |
| 1267010 | 4/1968 | Fed. Rep. of Germany . |
| 2801734 | 7/1979 | Fed. Rep. of Germany ...... 455/238 |
| 3205554 | 8/1983 | Fed. Rep. of Germany . |
| 3927759 | 10/1990 | Fed. Rep. of Germany . |

OTHER PUBLICATIONS

BMW AG, Seminar literature entitled "Kombi-instrument HIGH+LOW Check Control BC IV" with illustration FIG. 19 (Jun. 12, 1992).

Huber et al. article entitled "The New Mercedes-Benz Roadster-Car Body: Climate Control, Soft Top & Locking System," in ATZ Automobiltechnische Zeitschrift [Automotive News], vol. 91, No. 6, pp. 309–318 (Jun. 1989).

Primary Examiner—Donnie L. Crosland
Attorney, Agent, or Firm—Frishauf, Holtz, Goodman & Woodward

[57] ABSTRACT

A combination of automobile radio and city call or paging receiver equipped with a display (4) has the additional feature of a vehicle speed sensor (24) which is used to block display of possibly distracting information whenever the vehicle exceeds a predetermined speed limit set in a threshold switch (25). The display (4) is controlled by a microprocessor (7). A NAND gate (23), connected to the output of the speed threshold switch (25), is interposed between the city call data decoder (3) and the microprocessor (7). Another threshold stage (28) and NAND gate (27) can be interposed between the radio control panel (18) and the radio tuner (13) to keep the driver from making radio adjustments when he or she should be paying attention to the road instead.

3 Claims, 1 Drawing Sheet

AUTOMOTIVE ACCESSORY CONTROL CENTER

CROSS-REFERENCE TO RELATED PATENTS AND APPLICATIONS of Robert Bosch GmbH and its subsidiary Blaupunkt Werke GmbH, the disclosures of which are hereby incorporated by reference: U.S. Pat. No. 3,949,401, HEGELER et al., issued Apr. 6, 1976, entitled FREQUENCY IDENTIFICATION CIRCUIT FOR BROADCAST TRAFFIC INFORMATION RECEPTION SYSTEMS; U.S. Pat. No. 3,568,065, PAGANY; U.S. Pat. No. 4,435,843, EILERS & BRAGAS, issued March 1984; U.S. Pat. No. 4,450,589, EILERS & BRAGAS, issued May 1984; U.S. Pat. No. 4,499,603, EILERS, issued Feb. 12, 1985; U.S. Pat. No. 4,862,513, BRAGAS, issued Aug. 29, 1989, entitled RADIO RECEIVER WITH TWO DIFFERENT TRAFFIC INFORMATION DECODERS; German patent DE-PS 3927759, DUCKECK & BECKER, Oct. 18, 1990; U.S. Ser. No. 447,165, BRAGAS & DUCKECK, filed Dec. 7, 1989, now U.S. Pat. No. 5,065,452; U.S. Ser. No. 447,378, DUCKECK, filed Dec. 7, 1989, now U.S. Pat. No. 5,101,510; U.S. Ser. No. 459,144, MARDUS, filed Dec. 29, 1989, based on German pending application P 3724516 now U.S. Pat. No. 5,095,532; U.S. Ser. No. 459,147, DUCKECK & BRAGAS, filed Dec. 29, 1989, based on German pending application P 3810177 now U.S. Pat. No. 5,020,143.

CROSS-REFERENCE TO RELATED LITERATURE

European Broadcasting Union Technical Standard 3244-E, entitled SPECIFICATIONS OF THE RADIO DATA SYSTEM RDS FOR VHF/FM SOUND BROADCASTING (EBU Technical Centre, Brussels, Mar. '84, 60 pp.); European Patent Application 86-105467.4, Apr. 21, 1986, HEGELER, published Nov. 12, 1986 as European Patent Pub. 0 200 977 A2, corresponding to DE-OS 3516282, filed May 7, 1985.

FIELD OF THE INVENTION

The present invention relates generally to control centers for accessories installed in the passenger compartment of motor vehicles and, more particularly, to an improved control center for those accessories which have displays or otherwise demand the visual attention of the driver.

BACKGROUND

German patent DE-PS 3927759, DUCKECK & BECKER, issued Oct. 18, 1990, discloses a city-call or paging radio receiver, on whose display are represented data concerning the settings of an auto radio. The display is controlled by a microprocessor. This microprocessor control can be regard as the core of a motor vehicle accessory central control. That is why it is referred to here. If, during the trip, a new city call is indicated on the display and if the display happens to be near the edge of the field of vision of the driver, one may presume that the attention of the driver will be drawn by this remotely controlled dynamic process. However, a driver cannot afford such a diversion of his or her glance in every traffic situation. It can be particularly dangerous in traffic situations involving high speed.

THE INVENTION

It is therefore an object of the present invention to improve the conventional automotive accessory control centers in order to reduce this danger.

Briefly, the control center of the present invention reduces the danger of driver distraction by coupling a vehicle speed sensor to a gate between the paging receiver and the display, thereby permitting blocking of distracting information whenever a threshold vehicle speed has been exceeded.

DRAWING

FIG. 1 is a schematic diagram of the improved accessory control center of the present invention.

DETAILED DESCRIPTION

Figure 1:
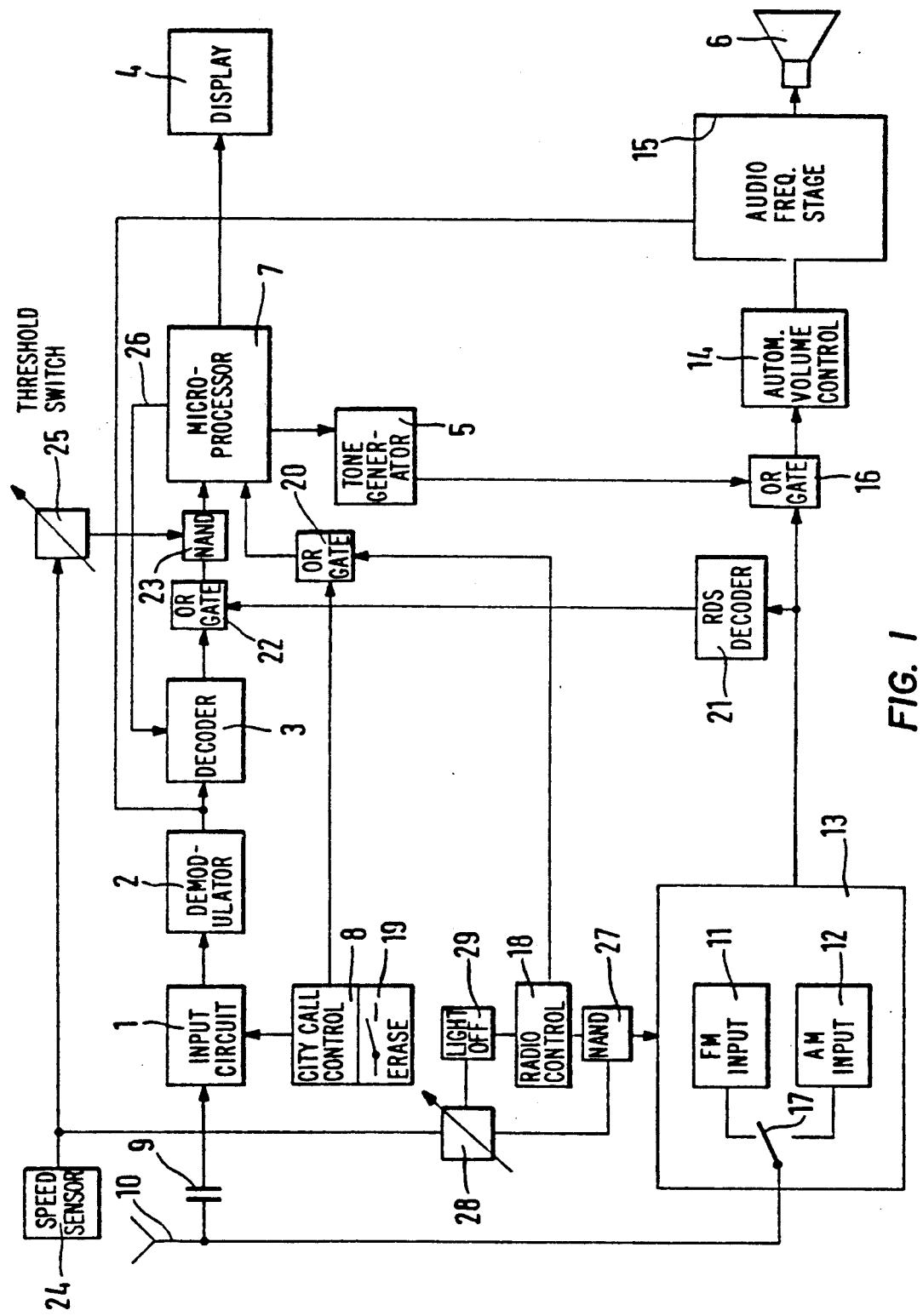

The preferred embodiment of the city call receiver of the present invention comprises an input circuit 1 set to the transmitter frequency, a demodulator 2 for the carrier signal, and a decoder 3. Decoder 3 feeds information to a display 4 whenever a message is received which calls for more than an acoustic calling signal via the calling tone generator 5 and the loud speaker 6. In connection with decoding, the received message is stored in temporary memory within decoder 3. Between the output of decoder 3 and the input of display 4, a microprocessor 7 is connected. Any of several commercially available microprocessors are suitable for this purpose, including those manufactured by MOTOROLA, SIEMENS and INTEL. Microprocessor 7 has a first input for remotely generated data connected to an output of decoder 3 and a second input for automatically generated data connected to the output of the control portion 8 of the city call receiver. The operating program of the microprocessor contains, among other things, the individual steps necessary for controlling the acoustic and optical indications associated with the message received. Such programs are conventional and well known in the cellular telephone industry and therefore need not be further detailed here.

The city call receiver is connected via a capacitor 9 to an auto radio antenna 10. The base of antenna 10 is also connected to the input of a tuner 13 which includes an FM or ultra short wave input circuit 11 and an AM or medium wave input circuit 12.

Tuner 13 is part of a radio receiver which contains not only the aforementioned input circuits but also conventional mixing stages an intermediate frequency stages, an audio frequency stage 15 and an automatic loudness control regulator 14 connected upstream of the audio frequency stage 15.

In conventional auto radios, upon change over from FM reception to AM reception, the mode or band selection switch 17 switches the FM input circuit off and the AM input circuit on. The selection switch of the auto radio is controlled from the radio's control panel 18.

The calling tone of the city call receiver is connected via an OR-gate 16 to the input of loudness or volume regulator 14 and thence through audio frequency stage 15 to the loudspeaker 6 of the auto radio, without requiring a previous switch over of the input circuits from FM to city call. This assures the owner of the city call receiver that the city call ring will take precedence over the receipt of a broadcast program, that is, the city calling tone may "disturb" the broadcast reception at will.

As discussed above, display 4 serves to represent alpha-numeric symbols of the received message. Since the message there represented is of no further interest after it has been reviewed by the owner of the receiver, an erase button 19 is provided in control panel 8 by means of which the driver can erase the city call information. After such erasure, data concerning the setting of the auto radio, such as the frequency of the selected transmitter and the actuated functions of the auto radio can be fed from the data output of the control panel 18 to display 4 via an OR-gate 20 and the second input of microprocessor 7. This erasure circuit has the result that the city call information is not constantly received, whereas the operating data of the auto radio are continuously accessible.

If the auto radio includes an RDS-decoder 21 which permits paging traffic, display 4 can also be used for information transmitted through the RDS service. The specifications of the Radio Data System (RDS) for VHS/FM Sound Broadcasting are set forth in European Broadcasting Union Technical Publication 3244-E, published March 1984.

Preferably, RDS decoder 21 has an input connected to an output of tuner 31 and has an output connected to an OR-gate 22 whose output is connected to the (first) input of microprocessor 7 for remotely-generated data.

A further refinement, of the city call receiver thus far described, includes an additional gate circuit 23 in the just-mentioned first input of microprocessor 7. Further, the invention includes a vehicle speed sensor 24; such sensors are today used in many devices for engine control. The output of speed sensor 24 is connected to a threshold value stage 25, whose threshold is adjustable. Preferably, the output of decoder 3 is connected to an input of the aforementioned OR-gate 22, whose output is connected to gate circuit 23, which in turn has an output connected to first input of microprocessor 7. A second input of gate circuit 23 is connected to the output of threshold switch 25.

Preferably, gate circuit 23 is a NAND gate. As soon as the output signal of sensor 24 exceeds the preset value in threshold value stage 25, that is, as soon as the speed of the vehicle exceeds a predetermined speed, gate circuit 23 blocks. The received message thus fails to reach display 4 and cannot distract the driver. The call or ring tones nevertheless continue to reach the driver.

As soon as the driver reduces the speed of the vehicle to below the predetermined value, the received message, which is still in the temporary memory of decoder 3 can be read out. To allow for this, there is a feedback line 26 from an output of microprocessor 7 to an input of decoder 3.

A second embodiment of the invention includes a gate circuit 27 connected to an output of control portion 18 of auto radio 13. Gate circuit 27 has a second input connected to a second threshold value stage 28, whose input in turn is connected to the output of vehicle speed sensor 24. This gate circuit 27 is preferably also a NAND gate. This NAND gate prevents, as soon as the vehicle exceeds the speed programmed into the threshold value stage 28, the carrying out of adjustment commands which have been made manually at control panel 18. In order to indicate this to the driver, preferably a breaker switch 29 is provided in the lighting circuit of the control panel 18. Switch 29 is controlled by the output signal of threshold stage 28 so that the illumination of the control panel is interrupted as soon as the speed limit is exceeded.

Various changes and modifications are possible within the scope of the inventive concept, and features of one embodiment may be combined with feature of another embodiment.

We claim:

1. Automotive accessory control center for the operation of an accesory device which demands the visual attention of a driver, comprising
   a display (4);
   display control means (7) having an input for remotely generated data and an output controlling said display (4) to produce optical indications thereon;
   means (1, 2, 3) for receiving remotely generated data;
   means (24) for measuring vehicle speed;
   a threshold switch (25) having an input connected to an output of said speed measuring means (24); and
   a NAND gate (23) having an output connected to said input of said display control means (7) and respective inputs connected to an output of said threshold switch (24) and to an output of said means for receiving remotely generated data.

2. Automotive accessory control center for the operation of an accessory device which demands the visual attention of a driver, comprising
   a control panel (18) for manual actuation of the accessory device;
   means (24) for measuring vehicle speed;
   a threshold value stage (28) having an input connected to an output of said speed measuring means (24); and
   a NAND gate (27) having a first input connected to an output of said threshold stage (28), a second input connected to an output of said control panel (18) and an output connected to said accessory device (13-15, 6, 4), said NAND gate blocking transfer of signals from said control panel to said accessory device whenever said vehicle speed exceeds a predetermined threshold in said threshold value stage, thereby preventing distraction of said driver while said vehicle speed is above said threshold.

3. Control center according to claim 2, further comprising
   an illumination circuit in said control panel (18) and an illumination interruption switch (29) controlled by an output signal of said threshold value stage (28).

* * * * *